INVENTORS.
Henry L. Glass
BY Walter J. Schrenk

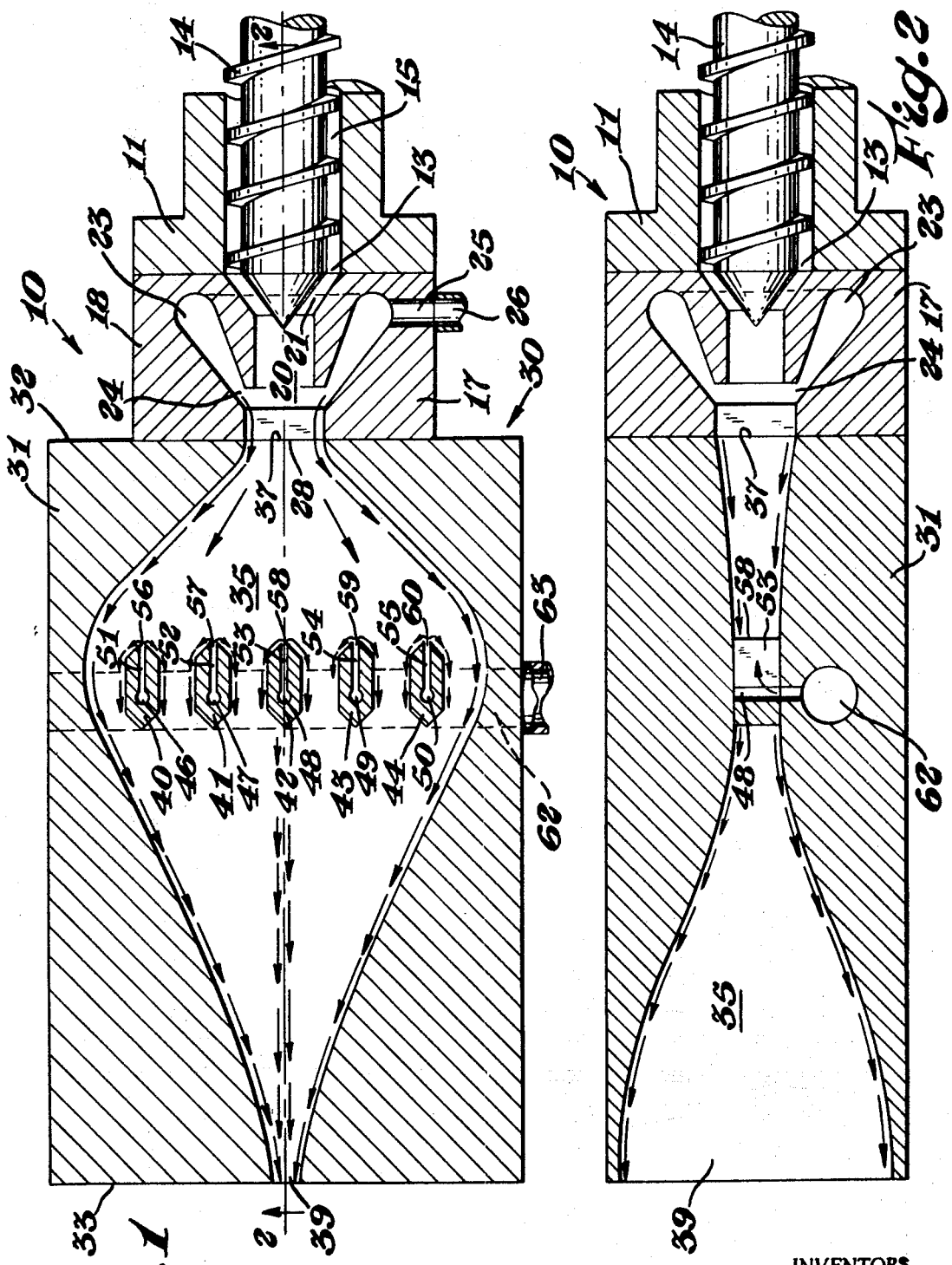

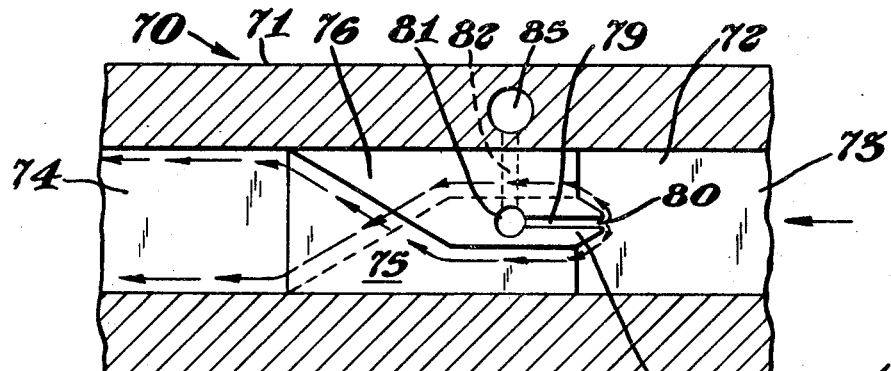
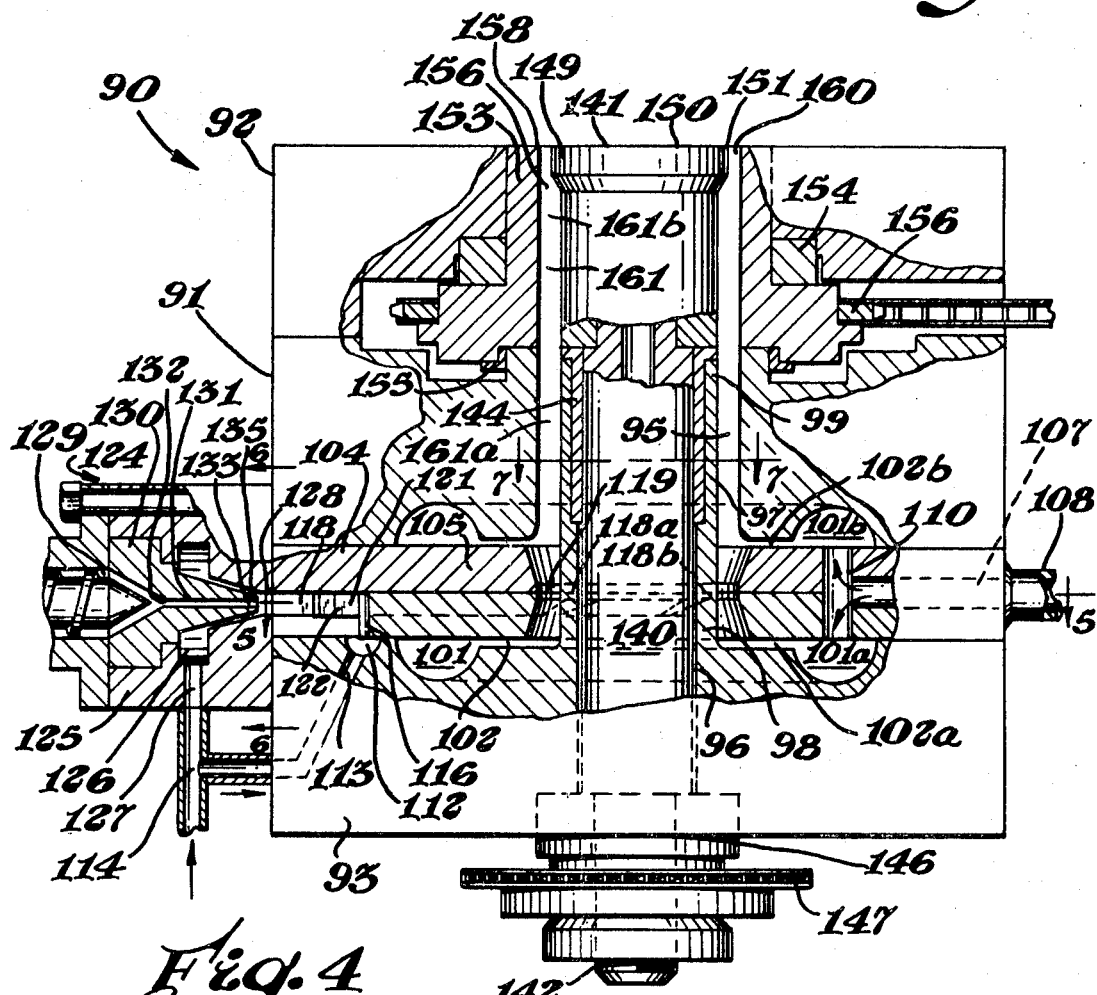

AGENT

United States Patent Office 3,606,636
Patented Sept. 21, 1971

3,606,636
EXTRUSION DIE
Henry L. Glass, Midland, and Walter J. Schrenk, Bay City, Mich., assignors to The Dow Chemical Company, Midland, Mich.
Original application May 5, 1967, Ser. No. 636,481, now Patent No. 3,511,903. Divided and this application Sept. 30, 1969, Ser. No. 871,156
Int. Cl. B29d 7/02, 23/04
U.S. Cl. 18—13P                                        6 Claims

ABSTRACT OF THE DISCLOSURE

A multi-component extrusion die is shown which is particularly suited for handling corrosive polymers wherein a corrosive or degradable polymer is encapsulated by a countercurrent flow of an encapsulating polymer.

---

This application is a divisional application of our copending application Ser. No. 636,481, filed May 5, 1967, Pat. No. 3,511,903.

This invention relates to an improved extrusion die and the extrusion of synthetic resinous materials.

Frequently, it is desirable to extrude as a single body a plurality of diverse synthetic resinous materials. Oftentimes, a desirable component of such a composite extrude is a resin which is relatively thermally unstable and is frequently corrosive to many of the conventional and desirably used materials employed for die construction. For example, saran, which is a copolymer containing a relatively high percent of vinylidene chloride, for example 80 percent, is difficult to extrude and requires precautions not required with materials such as polyethylene and polystyrene which are relatively stable. Polyethylene and polystyrene, as well as many other thermoplastics, are readily extruded from carbon steel equipment, whereas the less stable and corrosive sarans require elegant nickel alloys. In preparing a multilayer structure, such as a multilayer film, which contains a thermally degradable polymer as one element, it is necessary to contain the thermally degradable polymer within a relatively stable polymer or within metal components which are resistant to the corrosive activity of the degradable material. Also, it is desirable that the residence time of the degradable material within the extruding configuration be as short as possible. Machining and preparation of extrusion dies particularly those for the preparation of multilayer film and sheet as well as tubes, rods and other shapes is relatively expensive and when corrosive resistive elements must be incorporated within the die, the expense is greatly increased.

It would be desirable if there were available a die for the preparation of multi-component bodies wherein the quantity of corrosion resistant material were maintained at a minimum.

It would be further advantageous if there were available an improved method for the extrusion of at least two diverse plastic materials to form a composite body wherein one of the materials contacted a minimal proportion of the extrusion die.

These benefits and other advantages in accordance with the present invention are achieved in an extrusion die for the extrusion of at least two diverse synthetic resinous materials, the die comprising a housing having an upstream end and a downstream end, a plenum defined within the housing, the plenum terminating at the upstream end of the housing in a polymer inlet and at the downstream end of the housing in a polymer discharge aperture, means to extrude a stream of a diverse synthetic resinous material disposed within the plenum, the means comprising an internal housing having an internal cavity, the internal cavity communicating with an extrusion orifice, the improvement which comprises disposing the internal housing within the plenum with the extrusion orifice toward the upstream end of the cavity, a generally annular means adjacent to the upstream end of the cavity, a polymer supply means defining a generally annular configuration and adapted to discharge a synthetic resinous material into the periphery of the plenum adjacent the upstream end.

The method of the invention comprises the steps of extruding a thermally degradable or corrosive synthetic resinous heat plastified stream within a configuration, encapsulating the stream of degradable thermoplastic material within a stream of heat stable material, introducing within the stream of heat degradable material a stream of heat stable material issuing from a configuration, the configuration disposed within the stream of degradable material, discharging a stream of heat stable material in a direction counter to the flow of the degradable material, the degradable material causing the stream of heat stable material to surround the configuration, discharging a composite stream of heat stable material and degradable material wherein the degradable material is encapsulated within the stream of heat stable material and contains at least one inner layer of heat stable material.

Further features and advantages of the present invention will become more apparent from the following specification when taken in connection with the drawing wherein:

In FIG. 1 there is schematically illustrated a sectional view of an apparatus in accordance with the present invention.

In FIG. 2 there is depicted a sectional view of the apparatus of FIG. 1 taken along the line 2—2.

In FIG. 3 there is depicted a sectional view of an alternate embodiment of the invention.

In FIG. 4 there is depicted a cross-sectional configuration of an alternate embodiment of the invention particularly adapted for preparing tubular material.

Figure 5:
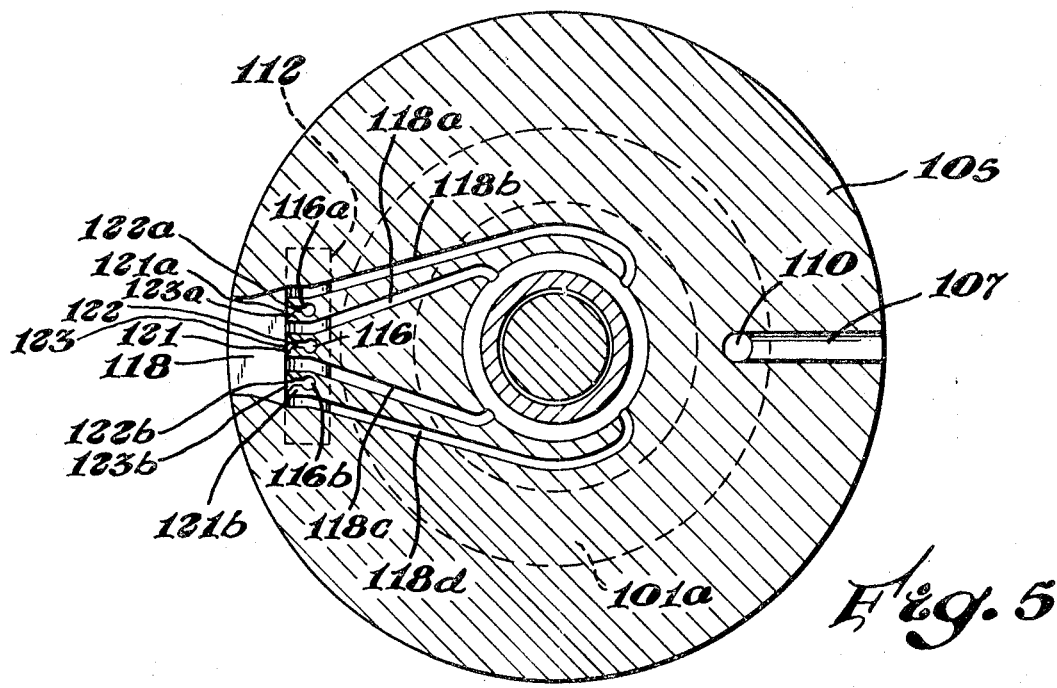
FIG. 5 is a sectional view of the apparatus of FIG. 4 taken along the line 5—5 thereof.

In FIG. 1 there is depicted a sectional view of an extrusion apparatus in accordance with the present invention generally designated by the reference numeral 10. The apparatus 10 comprises in cooperative combination a first source of synthetic resinous thermoplastic material designated by the reference numeral 11. The first source 11 has a discharge passageway 13 generally axially disposed relative to an extruder screw 14 positioned within a barrel or cylindrical cavity 15 of the polymer source 11. An extrusion adaptor 17 is disposed adjacent the supply source or supply 11 and adapted to receive a stream of heat plastified synthetic resinous material therefrom. The extrusion adaptor 17 comprises a body 18 having defined therein a generally centrally disposed rectangular passageway 20. The passageway 20 has a generally tapering portion 21 adapted to mate with the source 11 and receive heat plastified synthetic resinous material therefrom. The adaptor 17 defines an internal generally annular plenum 23. The plenum 23 communicates with the passageway 20 by means of a generally annular rectangular passageway 24 having a width of substantially less than the maximum width of the plenum 23. The body 18 defines a second polymer passageway 25. The polymer passageway 25 provides full communication between a plenum 23 and a second source 26 of a heat plastified synthetic resinous material. The passageway 20 of the adaptor 17 has a second or discharge end 28 having a generally rectangular cross-sectional configuration. An extrusion die 30 is operatively connected to the adaptor 17 in such a manner that it receives heat plastified synthetic resinous material from the discharge opening 28. The die 30 comprises a body or housing 31 having a first or upstream end 32 and a second or downstream end 33. The inlet end 32 is in sealing engagement with the adaptor 17. The die body 31 defines an internal passageway or plenum 35 which extends from the first or inlet end 32 to the second or discharge end 33. The cavity 35 has a generally streamlined configuration and has a first or inlet opening 37 generally coextensive with the discharge opening 28 of the adaptor 17. The cavity 35 terminates in an extrusion slot or polymer discharge aperture 39 defined by the body 31 at the second end 33. The cavity 35 has disposed therein a plurality of stream dividers or internal housings 40, 41, 42, 43 and 44. The stream dividers 40, 41, 42, 43 and 44 are positioned in spaced apart relationship across the maximum dimension of the cavity 35 generally adjacent the inlet end 37. Each of the stream dividers 40, 41, 42, 43 and 44 define internal passageways or cavities 46, 47, 48 49 and 50 and extrusion passageways 51, 52, 53, 54 and 55, respectively. The extrusion passageways 51, 52, 53, 54 and 55 terminate in extrusion orifices 56, 57, 58, 59 and 60, respectively, whose length is generally commensurate with the length of the stream dividers. The die 31 has in cooperation therewith a third polymer passageway 62. The third polymer passageway 62 is in full communication with the passageways 46, 47, 48, 49 and 50 and in communication with a third polymer source 63 of the heat plastified synthetic resinous material. Each of the stream dividers 40, 41, 42, 43 and 44 is arranged in such a manner that the discharge openings 56, 57, 58, 59 and 60, respectively, are directed toward the inlet end 37 of the passageway 35. The passageway 35 narrows in the illustrated dimension toward the second end 33 and broadens in a plane normal to the plane of the paper. The lines or arrows in FIG. 1 partially indicate the boundary layers or interfaces between polymers from the first, second and third polymer sources.

In FIG. 2 there is illustrated a schematic sectional representation of the apparatus 10 of FIG. 1 taken along the line 2—2 wherein the configuration of the cavity 35 is depicted and the relative dimensions of the stream dividers is shown. As in FIG. 1, the line of arrows indicates the interface between diverse synthetic resinous materials.

In operation of the apparatus of FIG. 1, a first synthetic resinous material in heat plastified form is supplied from the source 11. A second heat plastified synthetic resinous material is supplied by the source 26. The second material from the source 26 passes through the passageway 25 into the plenum 23 and is discharged in the form of a generally rectangular annular ring or sleeve about the material supplied from the first source. Thus, at a section between the adaptor 17 and the die 31, a composite stream of synthetic resinous material is provided wherein a central material is encapsulated within a generally annular sheet of second synthetic resinous plastified material. Beneficially, the first material may be one of a heat unstable or corrosive nature and it is separated from the die 31 by means of a layer of the second polymer. Thus, if the second material or polymer is relatively stable or chemically inert, the die 31 may be prepared of relatively low cost stock such as mild steel or the like. The third polymer source 63 supplies heat plastified non-corrosive polymeric material to the passageway 62. From the passageway 62, the polymeric material passes into the passageways 46, 47, 48, 49 and 50 of the stream dividers 40, 41, 42, 43 and 44. The passageways 46, 47, 48, 49 and 50 discharging through the passageways 51, 52, 53, 54 and 55, discharge the polymer through the discharge openings 56, 57, 58, 59 and 60, respectively, effectively upstream and against the flow of material from the first and second polymer sources traveling through the first end of the passageway 55. Each of the streams issuing from the openings 56, 57, 58, 59 and 60 are divided and forced against the respective stream dividers, flow about the stream dividers and combine to form a single layer at a location lying between the stream dividers and the extrusion orifice 39, thus successfully preventing any contact of the corrosive material from the first polymer source with the stream dividers 40, 41, 42, 43 and 44. The resultant stream provided by the die consists of an outer layer of polymer from the second polymer source, a plurality of inner layers from the first polymer source and separated from each other by a plurality of layers from the third polymer source. The resultant film once extruded is then processed in the conventional manner and may be employed as sheet or subsequently tentered or stretched into film.

In FIG. 3 there is depicted an alternate embodiment of the invention generally designated by the reference numeral 70. The embodiment 70 shows a die body 71 having defined therein an internal passageway 72 equivalent to the passageway 35 of FIG. 1. The die body 71 has an upstream or first end 73 and a downstream or discharge end 74. Disposed within the passageway 72 is a stream divider 75. The stream divider 75 is a mixing baffle such as the mixing baffle shown in FIGS. 3, 4, 5, 6, 7 and 8 of U.S. Letters Patent 3,239,197 which is particularly adapted to increase the number of layers of a stream flowing therein. The baffle 75 comprises a body 76. The body 76 defines a first or upstream stream divider 78. The stream divider 78 has an elongate slot-like passageway 79 defined therein which terminates at the upstream end in an extrusion orifice 80. Within the baffle 75 there is disposed an internal baffle supply passageway 81 which is in comunication with the slot-like passageway 79 and a second supply passageway 82. The passageway 82 in turn provides communication with a third polymer supply passageway 85. Thus, the heat plastified synthetic resinous material passed into the passageway 85 flows through the passageway 82 into the passageway 81, from the passageway 81 through the passageway 79 and is discharged through the orifice 80 of the stream divider 78. The dotted lines shown in FIG. 3 indicate the path of portions of the stream of the third polymer emerging from the orifice 80.

Employing such a configuration, the number of layers at the downstream end 74 are about double the number of layers entering the upstream end plus two layers from the orifice 80. The mixing baffle 75 is substantially encapsulated within the third polymer material and protected from corrosive portions which may be in a stream flowing through the die.

Employing the apparatus substantially in accordance with FIGS. 1 and 2, mild steel is successfully employed for the die 30. When the first polymer source is supplied a vinylidene chloride polymer, it is found that it is only necessary to provide an anti-corrosive nickel lining to the passageway 20 between the first polymer source 11 and the annular extrusion orifice 24. The remainder of the equipment is mild steel and shows no corrosive effect from the vinylidene chloride polymer. Experiments with the stream dividers such as the dividers 40, 41, 42, 43 and 44 having discharge openings downstream indicated a high degree of corrosion.

In FIG. 4 there is depicted an alternate apparatus in accordance with the present invention generally designated by the reference numeral 90. The apparatus 90 is particularly adapted to prepare a tube which apparently has a plurality of layers in the wall thereof. The apparatus 90 comprises in cooperative combination a die body 91. The die body 91 has a first end 92 and a second end 93. The die body 91 defines an internal extrusion passageway 95 in operative communication with the first end 92. Generally coaxially disposed with the passageway 95, the body 91 defines a mandrel passageway 96 providing communication between the passageway 95 and the second end 93 of the die body 91. The body 91 defines a centrally disposed tubular sleeve 97 extending into the passageway 95 toward the first end 92. The sleeve 97 has a first end 98 and a terminal end 99. The terminal end 99 is disposed generally adjacent the first end 92. The body 91 defines an internal annular polymer receiving cavity 101 generally coaxially disposed with relationship to the passageway 96 and positioned adjacent the first end 98 of the sleeve 97. A polymer receiving passageway 101 is in communication with the passageway 95 by means of an inwardly facing annular extrusion passageway 102. The body 91 has a polymer distribution assembly 104. The polymer distribution assembly 104 has a generally plate-like annular configuration and extends into the annular passageway or chamber 101 and the passageway 102. The polymer distributing assembly 104 comprises a body 105 having defined therein a first polymer passageway 107. The polymer passageway 107 is in operative communication with a heat plastified synthetic resinous source 108. The passageway 107 terminates at a passageway 110 defined by the body 105 and extending in a direction generally transverse to the passageway 107. The passageway 110 is in full communication with space external to the body 105 and is in full communication with the annular chamber 101. The body 105 divides the annular chamber 101 into two portions 101a and 101b, respectively. The body 105 also divides the annular extrusion passageway 102 into two annular extrusion passageways 102a and 102b, respectively. The body 91 defines a polymer receiving plenum 112 disposed adjacent and radially outward from the annular polymer passageway 101. The plenum 112 is in operative communication with a passageway 113 which in turn is in operative communication with a second polymer source 114. The polymer distribution body 105 adjacent the plenum 112 defines a plurality of passageways 116 which provide communication between the plenum 112 and a third polymer receiving passageway 118. The third polymer receiving passageway 118 extends from a location external to the body 91 to an inner surface 119 of the annular body 105. The passageway 118 is divided into four passageways 118a and 118b, and passageways 118c and 118d, not shown. Within the body 105 there is defined three stream dividing means 121, 121a and 121b (only 121 is shown). The stream dividing means 121 defines an extrusion passageway 122 providing communication between the passageways 116 and 118. The passageway 122 has a generally slot-like configuration. In operative combination with the body 91 is an extrusion apparatus 124. The extrusion apparatus 124 comprises an encapsulating body 125. The encapsulating body 125 defines an internal rectangular plenum 126. The encapsulating plenum 126 is in operative communication with the second polymer source 114 by means of a passageway 127. Adjacent the body 91, the plenum 126 terminates in a generally rectangular extrusion orifice 128 which has a cross-section substantially identical to the cross-section of the passageway 118. The distribution body 105 has in cooperative combination therewith a third polymer source 129. The third polymer source 129 is in operative communication with a stream shaping means or bushing 130 disposed within the plenum 126. The stream shaping means or bushing 130 defines an internal extrusion passageway 131 having an inlet end 132 and an outlet end 133. The outlet end 133 has a generally rectangular cross-section having dimensions smaller than the cross-sectional configuration of the passageway 118. The body 125 and the bushing 130 define a hollow rectangular extrusion passageway 135 in operative communication with the opening 128 and the plenum 126. A mandrel 140 is centrally disposed within the passageways 96 and 95 of the body 91. The mandrel 140 has a first end 141 and a second end 142. The mandrel 140 is rotatably supported within the body 91 by means of a first bearing means 144 supported by the second end 99 and the sleeve 97. The second end 142 of the mandrel 140 is rotatably supported at the second end 93 of the housing 91 by a bearing 146. A rotating or drive means 147 is affixed to the second end 142 of the mandrel 140. The first end 141 of the mandrel 140 has rigidly affixed thereto a die orifice defining sleeve 149. The sleeve 149 has a terminal end 150 remotely disposed from the second end 142. The end 150 defines an inner die lip or die lip defining means 151. An annular die defining member 153 is rotatably disposed within the housing 91 and supported therein by a first die bearing 154 and a second die bearing 155. The die defining member 153 is in operative communication with a rotating means 156. The die defining means 153 has an internal passageway 156 and a die lip defining surface 158 disposed adjacent the die lip defining means 151. The die lip defining means 151 and 158 define an annular extrusion orifice 160 which is in operative communication with an annular extrusion passageway 161 defined by the mandrel 140, the external die defining means 153, the housing 95, the sleeve 97 and is co-extensive with the peripheral portion of the passageway 95. The extrusion passageway 161 has a static wall portion 161a and a movable wall portion 161b.

In FIG. 5 there is depicted a view of the polymer distribution body 105 taken along the line 5—5 of FIG. 4. FIG. 5 depicts the annular plate-like configuration of the distribution body and a view of the passageway 118 and its four branches 118a, 118b, 118c and 118d, respectively. The stream dividing means 121, 121a and 121b are disposed in the passageway 118. The stream dividing means 121, 121a and 121b have polymer passageways 116, 116a and 116b, respectively, each of the passageways communicating with the second polymer plenum 112. The stream dividing means 121, 121a and 121b define internal passageways 122, 122a and 122b, respectively, which are directed outwardly and away from the center of the distribution body. Remote from the passageways 116, 116a and 116b, the passageways 122, 122a and 122b terminate in an outwardly flaring configuration 123, 123a and 123b, respectively, the location of the cavity 101a and the passageways 107 and 110.

Figure 6:
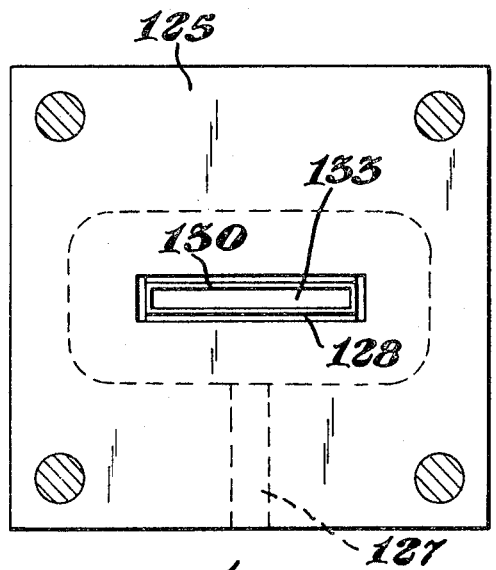
FIG. 6 is a view of the apparatus of FIG. 4 taken along the line 6—6 thereof.

FIG. 6 is a view of the body 125 taken along the line 6—6 of FIG. 4 showing the relationship of the opening 128 and the terminal portion 133 of the discharge passageway 131 of the bushing 130.

Figure 7:
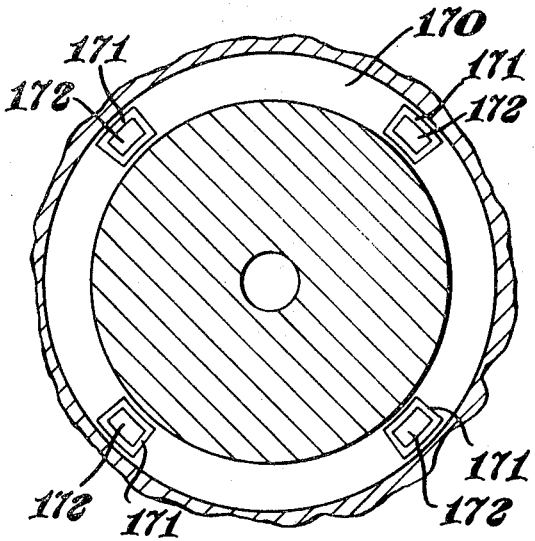
FIG. 7 is a sectional view of a heat plastified synthetic resinous extrude obtained from the apparatus of FIG. 4 at the location 7—7.

In FIG. 7 there is shown a schematic representation of the configuration of the extrude in the annular passageway 161a taken along the line 7—7 of FIG. 4 wherein the portion designated by the reference numeral 170 indicates the position of the molten polymer entering through the passageway 107. The material designated by the reference numeral 171 is material from the second polymer source 114, and the reference numeral 172 depicts material which was added from the third polymer source 129.

In operation of the embodiment of the invention as depicted in FIGS. 4, 5 and 6, a first polymer from the polymer source 108 enters the distribution body 105 through the passageway 107, enters the passageway 110, flows into the cavity portions 101a and 101b and radially inwardly through the passageways 102a and 102b, upwardly into the passageway portion 161a. The third polymer source 129 provides a generally rectangular stream of a readily degradable polymer into the passageway 131 and it is discharged from the second end 133 thereof in a generally rectangular configuration into the opening 128 and into the passageway 118. Material from the second polymer source 114 goes through the passageway 127 into the plenum chamber 126 and is extruded as an encapsulating sheath about the stream issuing from the stream 131. A portion of the polymer from the second source 114 enters the die body 91 through the passageway 113, into the plenum 112. The polymer is discharged from the plenum 112 through the passageways 116, 116a and 116b. From the passageways 116, 116a, and 116b the polymer flows radially outwardly through the passageways 122, 122a and 122b into the outwardly flaring configurations 123, 123a and 123b. The encapsulated stream is flowing in the passageway 118 in the direction indicated by the arrows and meets the second polymer issuing from the configurations 123, 123a and 123b. The material from the stream dividers flows outwardly around the stream dividers and portions of it form a continuous layer adjacent the stream dividers in each of the passageways 118, 118a, 118b, 118c and 118d, respectively. Thus, the material issuing from the passageways 118, 118a, 118b, 118c and 118d has the configuration of a rectangular core of material from the third polymer source encapsulated within an external layer of material from the second polymer source. These streams in turn are encapsulated within the material issuing from the annular passageways 102a and 102b which flow upwardly and provide the configuration as set forth in FIG. 7 wherein one has a matrix such as is indicated by the reference numeral 170 in FIG. 7 containing four substreams, each of the substreams comprising a central rectangular core and a rectangular sheath. As the composite stream is extruded through the passageway 161 relative rotation of the mandrel 140 and the external die defining means 156 causes the substreams to be stretched and form four layers within the composite stream, each of the four layers defining a spiral path proportional to the rate of extrusion and the relative rate of rotation in the die. Thus, the extrude issuing from the orifice 160 has four layers of material from the third polymer source and eight layers of material from the second polymer source. If the extruded tubular configuration is sampled and the apparent number of layers determined, the number can be very high depending on the relative rate of rotation and the rate of extrusion through the orifice. By encapsulating the material from the third polymer source, only the bushing 130 need be prepared from corrosion resistant material, as the degradable material passes through the die always within a sheath of material from the second polymer source.

Although the embodiment of FIGS. 4, 5 and 6 is depicted as having three polymer sources, multilayer structures are readily prepared employing only the second and third polymer sources. When this is done, a cross-section comparable to FIG. 7 is obtained wherein the rectangular substreams expand to fill the entire annulus.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. In an extrusion apparatus useful in the extrusion of at least two diverse synthetic resinous materials, the apparatus comprising
   a housing having
      an upstream end and
      a downstream end,
   a plenum defined within the housing, the plenum terminating at the upstream end of the housing in
      a polymer inlet and at the downstream end of the housing in
      a polymer discharge aperture,
   means to extrude a stream of diverse synthetic resinous material disposed within the plenum, the means comprising
      an internal housing having
         an internal cavity, the internal cavity communicating with
         a discharge opening, the improvement which comprises disposing the internal housing within the plenum with the discharge opening toward the upstream end of the cavity, a polymer supply means defining a generally annular configuration and adapted to discharge synthetic resinous material into the periphery of the plenum adjacent the upstream end thereof.

2. The apparatus of claim 1 wherein the discharge opening of the internal housing has a generally outwardly flaring configuration.

3. The apparatus of claim 1 wherein the polymer discharge aperture has a generally slot-like configuration.

4. The apparatus of claim 1 wherein a rotatable mandrel is disposed within the discharge aperture, the discharge aperture having a generally circular configuration.

5. The apparatus of claim 4 wherein the discharge aperture is defined by a mandrel and a rotatable element of the housing.

6. The apparatus of claim 5 including means to supply a plurality of streams of thermally degradable polymer to the plenum.

References Cited

UNITED STATES PATENTS

| 3,024,494 | 3/1962 | Szpila | 18—13P |
| 3,315,306 | 4/1967 | Ladner et al. | 18—13P |
| 3,321,804 | 5/1967 | Breidt, Jr., et al. | 18—13P |
| 3,337,914 | 8/1967 | Corbett et al. | 18—13P |

J. SPENCER OVERHOLSER, Primary Examiner

D. S. SAFRAN, Assistant Examiner

U.S. Cl. X.R.

18—13R, 14R, 14RR